March 30, 1926. 1,578,860
J. SOUSEDIK
STARTING MECHANISM FOR ALTERNATING CURRENT MACHINES
Filed Sept. 16, 1922
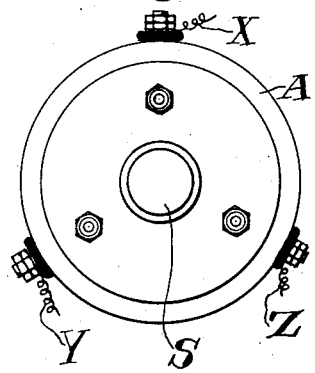
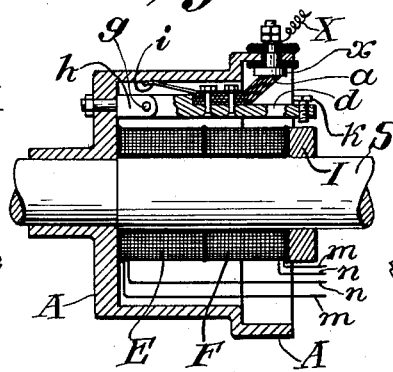
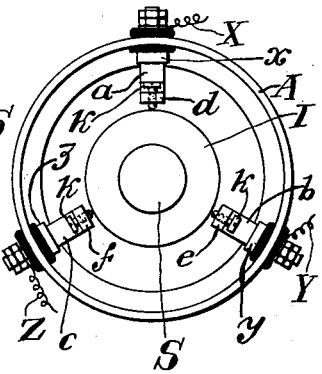
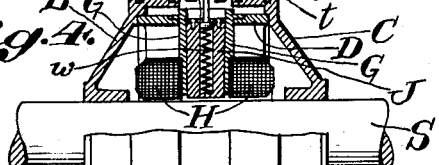
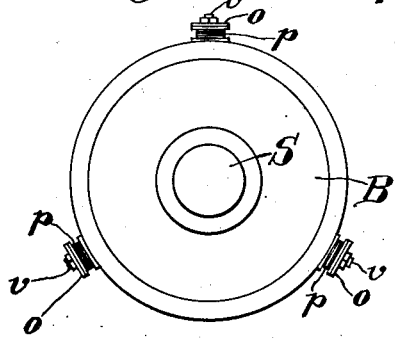
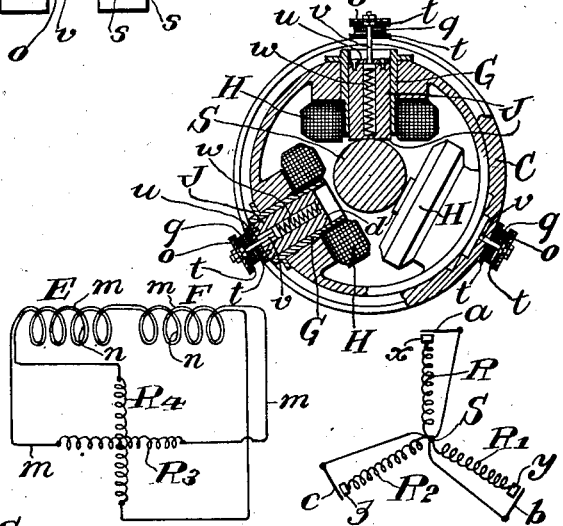
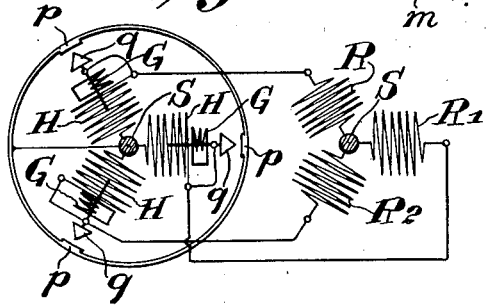
INVENTOR.
Josef Sousedik
BY
ATTORNEY.

Patented Mar. 30, 1926.

1,578,860

UNITED STATES PATENT OFFICE.

JOSEF SOUSEDIK, OF VSETIN, CZECHOSLOVAKIA, ASSIGNOR OF ONE-THIRD TO ROBERT SUCZEK, OF PHILADELPHIA, PENNSYLVANIA.

STARTING MECHANISM FOR ALTERNATING-CURRENT MACHINES.

Application filed September 16, 1922. Serial No. 588,740.

*To all whom it may concern:*

Be it known that I, JOSEF SOUSEDIK, a citizen of Czechoslovakia, residing at Vsetin, in the county of Moravia, have invented certain new and useful Improvements in Starting Mechanism for Alternating-Current Machines, of which the following is a specification.

My invention relates to mechanism for starting alternating current machines, particularly asynchronous motors of any size and number of phases and comprising a rotor of one or more windings.

In accordance with my invention, switching mechanism rotatable with the motor shaft is subjected to centrifugal force and the force of electro-magnetic attraction, the former dependent upon the rotor speed and the latter dependent upon current supplied by a rotor winding or windings, the two forces being so applied that after a suitable time the switching mechanism suitably changes the condition of the circuit or circuits of the rotor winding or windings to effect suitable speed of the rotor, and particularly full speed.

In accordance with my invention, an electro-magnetic winding rotating with the rotor and energized by it produces magnetic flux in a magnetic circuit composed in part of movable means controlling the switching mechanism, and there is related with the magnetic circuit a short circuited secondary, as a resistance ring, the magnetic circuit producing large hysteresis effects or losses. By utilization of mechanism embodying my invention, the starting is so controlled that it shall not be too rapid, with a rate of change of speed which will not cause undue or dangerous flow of current from the supply mains to the motor; and the mechanism is of such character that the rate of change of current supplied to the motor and the time required for bringing the rotor up to speed may be easily adjusted or predetermined, without substantially impairing the efficiency of the motor.

For an illustration of some of the forms my mechanism may take, reference is to be had to the accompanying drawing, in which:

Fig. 1 is a longitudinal sectional view, partly in elevation, of starting mechanism embodying my invention.

Fig. 2 is an elevational view of the left end of the structure shown in Fig. 1.

Fig. 3 is an elevational view of the right end of the structure shown in Fig. 1.

Fig. 3ª is a diagrammatic view of the rotor and magnet winding circuits utilizing structure of the character shown in Figs. 1 to 3 inclusive.

Fig. 4 is a longitudinal sectional view, partly in elevation, of a further form of my mechanism.

Fig. 5 is an end elevational view of the structure shown in Fig. 4.

Fig. 6 is a cross sectional view of the structure shown in Fig. 4 at right angles to the shaft.

Fig. 6ª is a diagram of the rotor circuit and of the electro-magnetic windings for the utilization of apparatus of the character shown in Figs. 4 to 6 inclusive.

Referring to Figs. 1 to 3ª inclusive, there is shown automatic starting mechanism for an asynchronous alternating current motor having, for example, the three-phase main rotor windings R, $R^1$ and $R^2$ and the two-phase auxiliary rotor windings $R^3$ and $R^4$, Fig. 3ª.

Secured upon the steel rotor shaft S is the bell or cup-shaped member A, preferably of magnetizable material, such as cast iron, the open end or mouth of the member A being directed toward the rotor, not shown, secured upon the shaft S. One end of each of the main rotor windings R, $R^1$ and $R^2$ is electrically connected to the shaft S, and their other ends are connected by the conductors X, Y and Z to the switch contacts $x$, $y$ and $z$, respectively, carried by and insulated from the member A. Co-acting with the switch contacts $x$, $y$ and $z$, respectively, are the laminated brushes or movable contact members $a$, $b$ and $c$. Each of these movable contact members electrically connects with the member A and through it with the shaft S. The contact members $a$, $b$ and $c$ are secured, respectively, to the members $d$, $e$ and $f$, of iron, each pivoted, as at $g$, Fig. 1, to a member $h$ secured to the member A. A weak spring $i$ is carried by each of the members $d$, $e$ and $f$, and bears against the inner wall of the member A, and is so tensioned as to hold the contact members $a$, $b$ and $c$ away from their associated contacts $x$, $y$ and $z$ at low speds or when the shaft S is at rest, and to hold the members $d$, $e$ and $f$, at low speeds or when the shaft S is at rest, in such position that the screws $k$ carried by the members $d$, $e$ and $f$ are in engagement with the iron resistance ring I secured upon the shaft S and circumferentially continuous to form a short circuited transformer secondary. Surrounding the shaft S, which is their core, are the magnet windings E and F, each comprising two conductors $m$ and $n$. The two conductors $m$ of the windings E and F are connected in series with each other and are included in circuit with the auxiliary rotor winding $R^3$; similarly, the two conductors $n$ of the windings E and F are connected in series with each other and in circuit with the second two-phase auxiliary rotor winding $R^4$.

The windings E, F, shaft S, member A and ring I form a portion of a magnetic circuit with which co-act the iron armature levers $d$, $e$ and $f$, which, at low speeds or at rest, are adjusted to different distances, by suitably adjusting their screws $k$, with respect to the ring I.

The magnetic circuit described is of a character causing relatively large magnetic hysteresis effects or losses, and the resistance ring I is in effect a short circuited single turn secondary of a transformer whose primary comprises the winding E, F.

Mechanism of the character above described is more particularly suitable for motors of low power, as, for example, up to about twenty horse power. When the motor is thrown into communication with the power supply circuit, the auxiliary rotor windings $R^3$ and $R^4$ will generate electromotive-forces dephased ninety degrees and of a frequency equal to the frequency of the supply circuit. There will accordingly flow through the conductors $m$ and $n$ of the windings E and F two phase currents of like frequency, these currents being of sufficient magnitude to cause the rotor structure to be set into rotation. The current so flowing through the electro-magnet windings E and F exerts magnetic attraction upon the armatures $d$, $e$ and $f$, and induces a current in the resistance ring I. The rotor structure will increase in speed, and as it does so the frequency of the currents traversing the windings E and F will decrease, and the magnitude of the current induced in the ring I will change. As the rotor structure gathers speed, the centrifugal force acting upon the armatures $d$, $e$ and $f$ and their associated contact members $a$, $b$ and $c$ will increase, until at a suitable or predetermined speed, for example, 90 to 95 per cent of normal or full speed, the centrifugal force will overcome the counter forces of electro-magnetism and the counter forces exerted by the springs $i$, and the contact members $a$, $b$ and $c$ will come into engagement with their associated contacts $x$, $y$ and $z$, preferably in succession or one after the other as determined by the different adjustments of the screws $k$ effecting air gaps of different lengths between the armatures $d$, $e$ and $f$ and the ring I. When the contact members $a$, $b$ and $c$ engage their contacts $x$, $y$ and $z$, the main rotor winding R, $R^1$ and $R^2$ will be closed circuited, and since the rotor speed is already quite high or at nearly normal or full speed, the current induced in these windings will not be abnormal, but will suffice to drive the motor at full speed and under load.

Accordingly, the mechanism described prevents a too rapid starting and ensures an effective control of change of speed of the motor, and ensures gradually increasing current as distinguished from sudden rush of large current.

Referring to Figs. 4 to $6^a$ inclusive, there is shown another form of my invention suitable more particularly for machines of greater capacity. Secured upon the shaft S and in electrical conducting relation therewith are the two members B and C of cast iron, and between them is disposed the annular member D carrying the three radially extending cylinders or tubular members G. Upon the periphery of the members B and C opposite each of the members G is an iron bar $o$ extending parallel with the shaft. Each of the bars $o$ carries a pair of laminated contact members $p$ and $q$. The three contacts $p$ and the bar $o$ are held to the member B by the bolts $r$, the three contacts $p$ being therefore electrically connected to each other and the shaft S. Each of the three contacts $q$ and the associated bar $o$ are secured to the member C by the bolts $s$, the contacts $q$ being insulated from the member C and their associated bars $o$ by suitable insulating members $t$, $t$. Surrounding each of the tubular members G is a magnet winding H. Within each of the members G is an iron core J. By screws, not shown, threaded into the inner ends of the cores J, their inner ends are preferably disposed at different distances from the shaft S, thereby effecting air gaps of different lengths for the three electro-magnets or solenoids. At its outer end each core J carries a contact plate $u$ adapted to engage and bridge the associated contacts $p$ and $q$. Within each of the coils H and surrounding its core J is a resistance ring, which may be the member G, as indicated in the illustrated example. One end of each of the windings H is connected to the shaft S and the other terminals of the coils H may be connected to the contacts $q$. And the three-phase windings R, $R^1$ and $R^2$, of the rotor, are connected in star relation with the shaft S and their other ends connect with the three contacts $q$, the general circuit arrangement being indicated in Fig. $6^a$.

Each of the bars $o$ is provided with an aperture through which extends a regulating threaded rod $v$ provided with nuts for effecting relative adjustment as between the contacts $p$, $q$ and the contacts $u$ carried by the cores J. In a bore within each of the cores J is located a weak spring $w$ pressing the core toward the shaft S and holding it in innermost position while the motor is at rest or at very low speeds.

The shaft S, members B, C and the cores J, and associated magnetic parts form electro-magnets, and with the resistance rings G form transformers with short circuited secondaries. The magnetic circuit provides large hysteresis losses, and the windings H and their associated magnetizable members serve as solenoids and dampers, and the primaries and magnetic circuit of transformers.

When the motor is thrown on to the supply circuit, the current induced in the three-phase windings R, $R^1$ and $R^2$ traverses the windings H, each magnetizing its core, producing a force tending to hold the core to or near the shaft S, and inducing current in the short circuited secondaries G. The rotor starts slowly because of the effect of the energy losses in the secondary members G, the large inductive losses of the windings H, the high hysteresis of the magnetic circuit, and the impedance is high because of the short air gaps between the inner ends of the cores J and the secondary S. The action is in general similar to that described in connection with Figs. 1 to $3^a$ inclusive, the starting is suitably gradual and not rapid, and there is no sudden great rush of current from the line, but the current is controlled or graduated as the speed increases. Finally, the centrifugal force acting upon the cores J overcomes the magnetism and the effect of the springs $w$ and causes the contacts $p$ and $q$ to be bridged, whereupon the rotor windings R, $R^1$ and $R^2$ are brought into closed circuit for full speed and normal running.

In Fig. $6^a$ the general arrangement above described is indicated. The three contacts $p$ are connected to each other and to the shaft S. The co-operating contacts $q$ are connected to the rotor windings R, $R^1$ and $R^2$ and also to the solenoid windings H. The short circuited secondaries are indicated at G. It is apparent that as the centrifugal force increases, the contacts $q$ are carried out in opposition to the magnetic attraction exerted by the windings H and in opposition to the weak springs $w$, until they finally engage the contacts $p$ when the rotor windings R, $R^1$, $R^2$ are closed circuited, and the windings H in effect short circuited, the motor being near or at full speed at this time and the centrifugal force thereafter maintains the connections between the contacts $q$ and $p$.

As described in connection with Figs. 1 to $3^a$ inclusive, it is also true of the second arrangement of Figs. 4 to $6^a$ inclusive that the pairs of contacts are bridged in succession, due to the different lengths of the air gaps between the inner ends of cores J and the shaft S.

As regards both forms of the invention illustrated, in case of fall of speed of the motor to sufficiently low magnitude, the centrifugal force becomes small enough to cause the contacts to open, and the apparatus then assumes again its condition or position corresponding with the starting period.

What I claim is:

1. The combination with a rotor, of controlling mechanism rotatable therewith comprising switching mechanism controlling the rotor circuit, a plurality of magnetizable members movable away from the axis of rotation under the influence of centrifugal force controlling said switching mechanism, an element of said switching mechanism controlled by each of said magnetizable members, means traversed by rotor current for producing a field acting on said magnetizable members in opposition to centrifugal force, and means for causing said magnetizable members to move outwardly from the axis of rotation in succession.

2. The combination with a rotor, of controlling mechanism rotatable therewith comprising switching mechanism controlling the rotor circuit, a plurality of magnetizable members movable away from the axis of rotation under the influence of centrifugal force controlling said switching mechanism, an element of said switching mechanism controlled by each of said magnetizable members, means traversed by rotor current for producing a field acting on said magnetizable members in opposition to centrifugal force, the air gaps of said magnetizable members being so related to each other that said members move outwardly from the axis of rotation in succession.

3. The combination with a rotor having a plurality of windings traversed by currents of different phases, of controlling mechanism rotatable therewith comprising switching mechanism controlling said rotor windings and comprising a movable contact member for each of said rotor windings, a rotor shaft of magnetizable material, a magnet winding for each of said movable contacts and excited by a rotor winding, and a magnetizable core for each of said magnet windings having its inner end presented to said shaft and adapted to move one of said movable contact members by movement substantially radially outward from said shaft under the influence of centrifugal force opposed by the magnetic attraction between said core and said shaft, said cores having their inner ends disposed at different distances from said shaft, whereby they move outwardly in succession under the influence of centrifugal force.

In testimony whereof I affix my signature.

JOSEF SOUSEDIK.